A. PRIESTMAN & H. BEDDOES.
APPARATUS FOR CONTROLLING THE FLOW OF LIQUIDS.
APPLICATION FILED DEC. 7, 1909.

967,972.

Patented Aug. 23, 1910.

3 SHEETS—SHEET 3.

UNITED STATES PATENT OFFICE.

ALBERT PRIESTMAN AND HUBERT BEDDOES, OF PHILADELPHIA, PENNSYLVANIA.

APPARATUS FOR CONTROLLING THE FLOW OF LIQUIDS.

967,972.  Specification of Letters Patent.  Patented Aug. 23, 1910.

Application filed December 7, 1909. Serial No. 531,804.

*To all whom it may concern:*

Be it known that we, ALBERT PRIESTMAN, a subject of the King of England, and HUBERT BEDDOES, a citizen of the United States, both residents of the city and county of Philadelphia and State of Pennsylvania, have invented an Improvement in Apparatus for Controlling the Flow of Liquids, of which the following is a specification.

In certain cases it is desirable to control the flow of liquid at one place by the conditions existing at another place. For example, in systems of sewage purification, in which sewage is supplied to a series of beds in succession, it has been proposed to control the inlet to one bed by the level of the liquid in another. Such a system is described in Letters Patent of Albert Priestman, No. 749,825, dated January 19, 1904. In this case, however, the liquid during treatment is confined in a bed in which it assumes a definite level and the hydrostatic head of the liquid in the bed or in a chamber communicating therewith can be utilized for the purpose of controlling the inlet of the succeeding bed by suitable air locks and bells. This is not possible, however, where sand filters or percolating beds are used. In such cases there is no rise and fall of the level of the liquid supplied to the bed that can be utilized.

It is the object of our invention to enable the flow of liquid to one bed to be controlled by the flow of the liquid to another, irrespective of the rise and fall of the liquid in the bed, or where percolating beds are used. This we accomplish by leading off a part of the liquid at the inlet to any bed into a controlling apparatus by which the flow of liquid to the next bed in the series may be controlled through suitable air locks and bells. This liquid in the controlling apparatus also acts to control the inlet to its own bed. Thus the inlet to one bed is closed and the inlet to the next bed is opened by a portion of the liquid flowing into the first bed. The portion of the liquid that is thus utilized, being a part of the impure sewage, or tank effluent, must be treated before it is allowed to flow off. There is not usually sufficient fall to permit of the discharge of such portion of liquid, after it has performed its work, on the surface of the bed, and therefore we employ, in the controlling apparatus, a purifying chamber in which this liquid is treated so that it may be discharged into the underdrains and permitted to mix with the effluent from the filter bed without harm.

Figure 1:
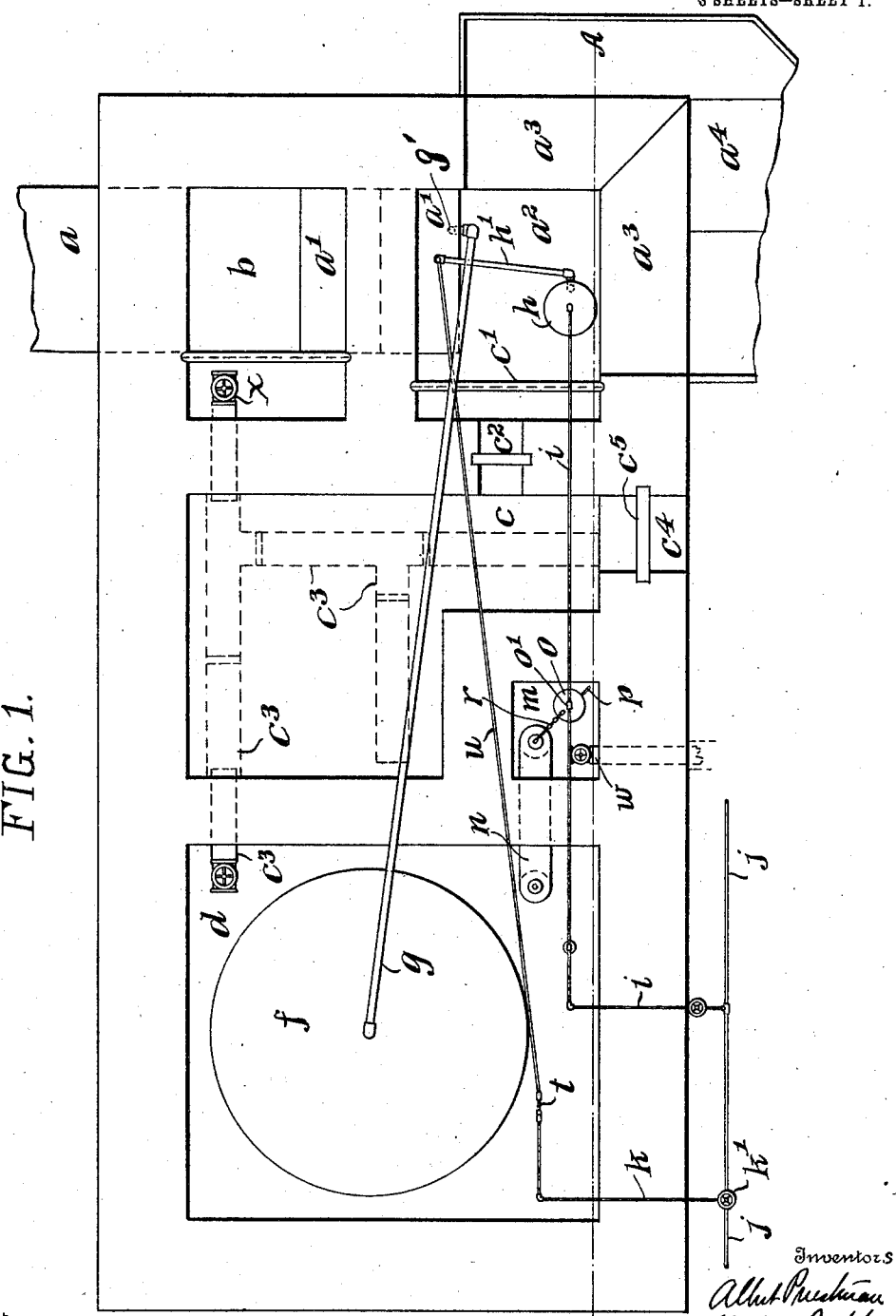
Figure 2:
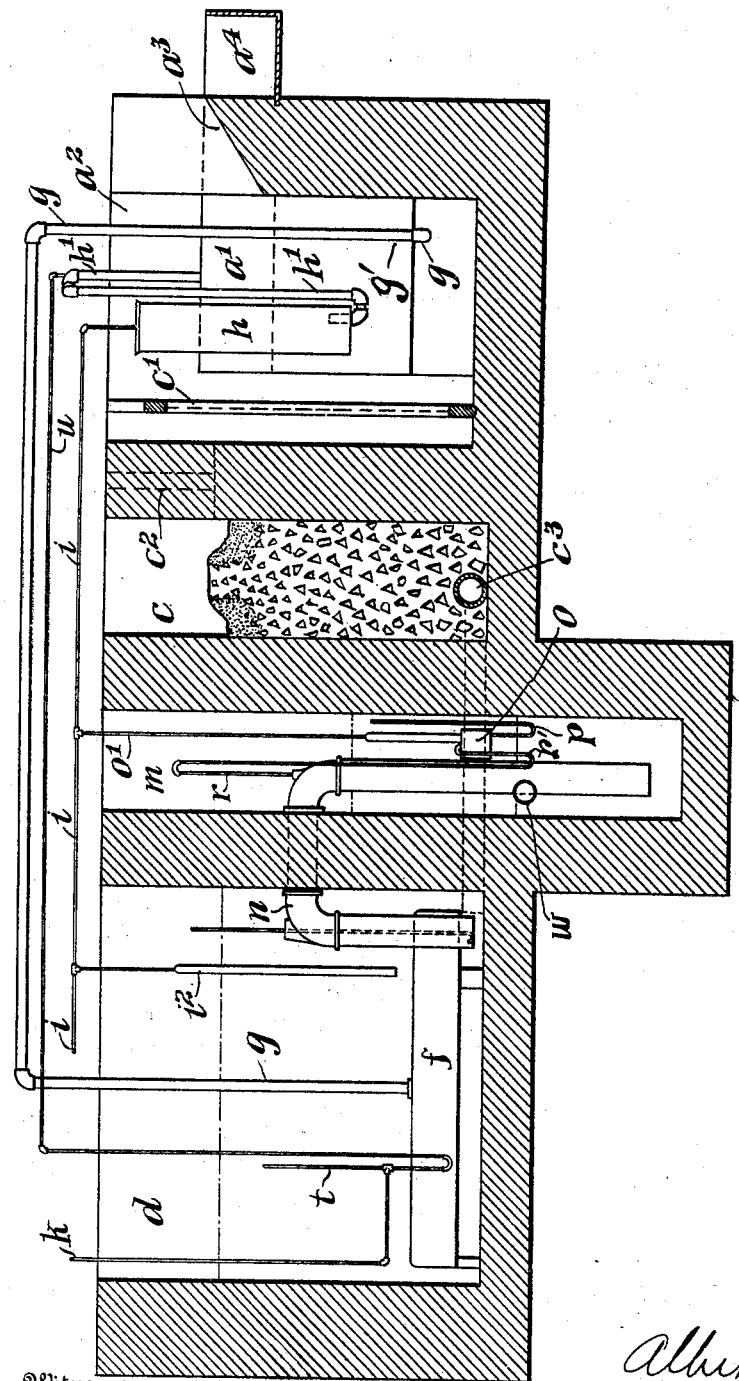

In the drawings: Figure 1 is a plan view of the controlling apparatus at one of the beds; Fig. 2 is a vertical section on the line A—A of Fig. 1; and Fig. 3 is a diagrammatic plan showing the connection between the controlling apparatus of different beds.

Figure 3:
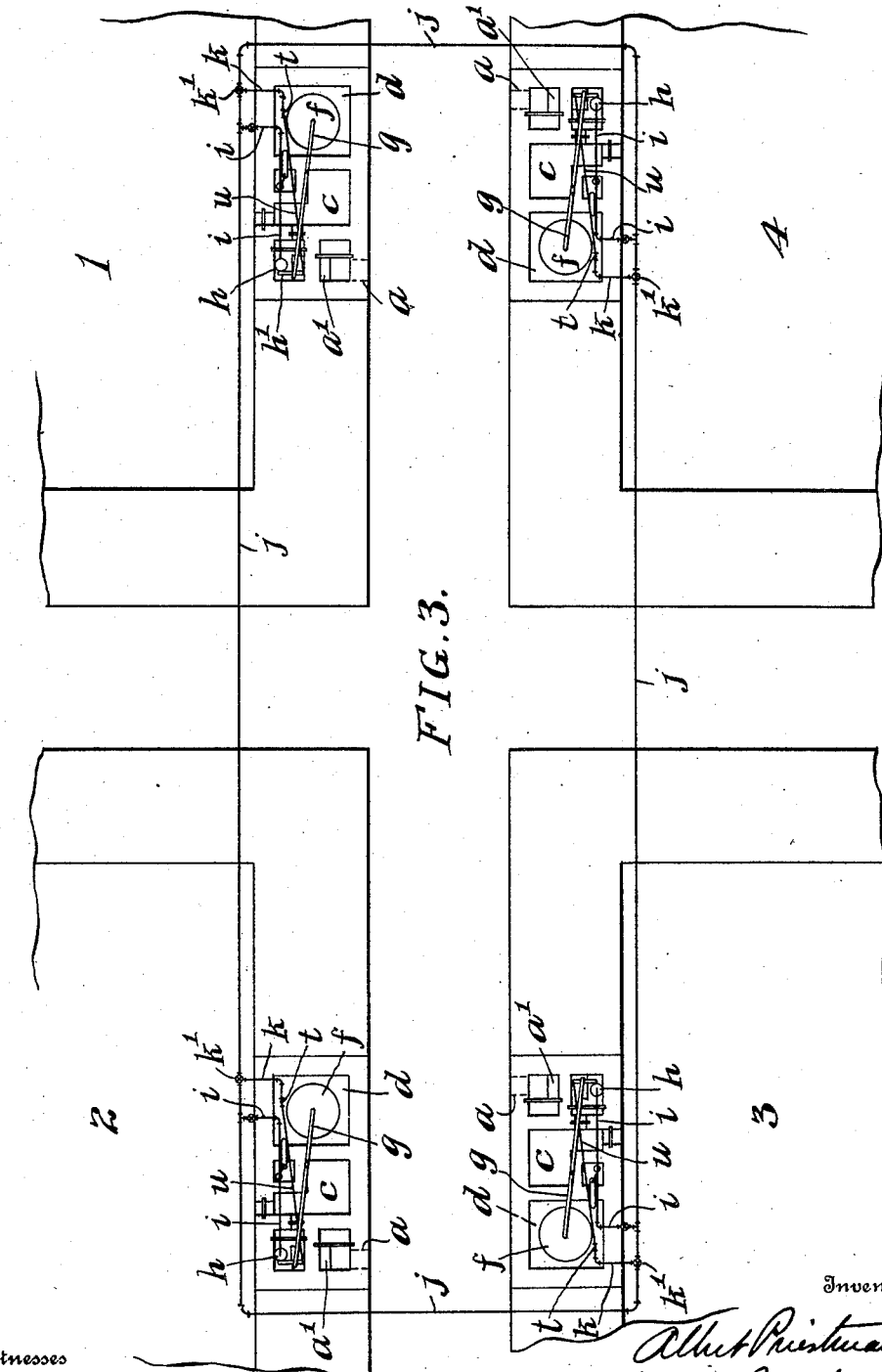

In the diagrammatic view shown in Fig. 3, we have illustrated four beds with the controlling apparatus so connected that the inlet sluiceway to each bed is controlled by the controlling apparatus at one of the other beds. This controlling apparatus, shown in Figs. 1 and 2, is the same at each bed.

$b$ is a chamber which the tank effluent enters through pipe $a$ and whence it passes through a $\cap$-shaped sluiceway $a'$ into the chamber $a^2$. From this chamber $a^2$ the major portion of the liquid flows over the weir $a^3$ and distributer $a^4$ upon the filtering bed. A portion of the liquid passes from the chamber $a^2$ through the screen $c'$ and over the weir $c^2$ into the purifying chamber $c$, from which it passes by the underdrain $c^3$ into the chamber $d$. This chamber $c$ is provided with a bed of filtering material, on the surface of which the liquid is discharged after passing the weir $c^2$ and through which it passes before reaching the drains $c^3$ by which it is discharged into the chamber $d$.

$c^4$ is an outlet from the chamber $c$ into the filtering bed controlled by an adjustable weir $c^5$ to discharge any excess of liquid, entering the chamber $c$, directly on the filtering bed. The bed of filtering material in the chamber $c$ is preferably what is known as a Dunbar bed composed of lower body of coarse broken material and upper layers of finer material increasing in size.

$f$ is a large air-bell in the chamber $d$ connected by an air-pipe $g$ having an upturned end $g'$ with the bottom of the sluiceway $a'$.

$h$ is an air-bell in the chamber $a^2$ having its bottom connected by an air-pipe $h'$ with the crown of the sluiceway $a'$.

$i$ is an air-pipe leading from the top of the air-bell $h$ to a pipe $j$ leading to bed No. 2, and from this pipe $j$ a branch $k$ leads to a release trap $t$ in an air-pipe $u$ leading from the crown of the inlet sluiceway $a'$, or airpipe $h'$ of the controlling apparatus of bed No. 2. (In Fig. 1 this pipe $k$ is the branch from the pipe $j$ leading from the apparatus at bed No. 4, see Fig. 3.) Communication between the pipe $j$ and the different branches $k$ is controlled by three way valves $k'$.

$m$ is a small chamber connected with the chamber $d$ by a siphon $n$.

$o$ is a small closed chamber or pocket in the lower part of the chamber $m$ having its crown connected by a small pipe $o'$ with the air-pipe $i$.

$p$ is a U-shaped pipe forming a liquid seal leading from the bottom of the pocket $o$.

$r$ is an air-pipe leading from the top of the siphon $n$ to the top of the small bell $o$ and having a liquid seal $r'$.

$w$ is a valved overflow pipe from the chamber $m$ into the underdrains of the filter bed.

The operation of the apparatus is as follows: We will suppose the sluiceway $a'$ to the apparatus at bed No. 1 open and that to the apparatus at bed No. 2 closed. The tank effluent flows by gravity through the sluiceway $a'$ into the chamber $a^2$ and thence over the weir $a^3$ and distributer $a^4$ to the filter bed No. 1. A portion of the liquid, also, passes through the screen $c'$ and over the weir $c^2$ into the chamber $c$, at a rate of flow regulated by the adjustment of the weir. The liquid in the chamber $c$, after traversing the filter bed passes by the drains $c^3$ into the chamber $d$, and when it reaches a predetermined level in the chamber $d$ air is forced from the bell $f$ through the pipe $g$, and when the air pressure in said pipe $g$ is sufficient to discharge the water from the upturned end of the pipe $g$, the air enters the sluiceway and seals it in the well known manner. The surplus air from the locked sluiceway passes by the pipe $h'$ into the air-bell $h$ in the chamber $a^2$ and is forced thence through the pipe $i$ into the pipe $j$ and branch $k$ to the release trap $t$ in the chamber $d$ of the apparatus at bed No. 2. This air operates the release trap $t$ to open the pipe $u$ and allow the air to escape from the sluiceway $a'$ at bed No. 2, and when that sluiceway is thus unlocked, the liquid will flow through it into that bed and a portion will also pass from the chamber $a^2$ into the chamber $c$, and the same operations will be performed in the apparatus at bed No. 2 as are performed at bed No. 1, and so on throughout the series. The trap $t$ shown is merely a U-shaped water-seal on the pipe $u$ in the chamber $d$. At the same time air from the pipe $i$ passes through the pipe $o'$ into the pocket $o$ and ejects the water contents therefrom, so that when the water seal of trap $t$ of bed No. 2 is broken it reduces the pressure holding the water in place in trap $r'$, and thus causing the pressure in pipe $r$ to break the water seal of trap $r'$. This allows the air to pass through the pipe $r$ from the siphon $n$, thus putting that siphon into operation and withdrawing the liquid from the chambers $d$ and $c$ into the small chamber $m$ whence it is discharged by the pipe $w$ into the underdrains.

$i^2$ is a vent pipe leading down from the pipe $i$ into the chamber $d$ to open the pipe $i$ and relieve the pipes $o'$ and $r$.

It will be noted that the air is not forced into the passageway or sluiceway $a'$ from the bell $f$ at a gradually increasing pressure, but is suddenly released and allowed to rush in when the pressure in the pipe $g$ has accumulated sufficiently to force the water seal in the upturned end $g'$. This results in a sudden flushing of air from the bell $f$ and the air thus supplied is utilized not only for air-locking the passageway $a'$ but also—through the bell or chamber $h$—for controlling the discharge pipe $n$ of the corresponding bed and the inlet $a'$ of another bed. The discharge pipe $n$ and the inlet $a'$ of the next bed are controlled by the surplus air that passes from the passage or inlet $a$, after it has been air-locked, into the pipe $h'$ and thence to the bell $h$.

The time occupied in filling the operating chamber $d$ to a level sufficient to operate the apparatus through the air-bell $f$ is the time during which the main flow passes to and feeds each filter bed. It follows that as soon as one bed is fed the inlet to that bed is locked and the inlet to the next bed in the series is unlocked, and as soon as that is accomplished the contents of the operating chamber in the first bed are discharged to restore the apparatus to operative condition to act when its sluiceway $a'$ is again unlocked in the cycle of operations of the series of beds.

The material in the chamber $c$ acts to retard the flow of the liquid into the chamber $d$ so that this chamber has the dual function of purifying the operating portion of the liquid and also of timing the flow into the chamber $d$ and the operation of the sluiceway $a'$ by the air-bell $f$.

A valved pipe $x$ leading from the inlet chamber $b$ directly into chamber $d$ enables the liquid to be supplied to the controlling apparatus at any bed without feeding such bed. The liquid passing through the pipe $x$ and underdrains of chamber $c$ directly into the chamber $d$ will rise in the chamber $d$ until it operates the air-bell to immediately close the sluiceway $a'$ to that bed and open the sluiceway $a'$ to bed No. 2. By this means the inlet $a'$ of any filtering bed may be closed at will without disturbing the control of the other beds in the series.

While we have shown and described our invention as particularly adapted to those cases in which the liquid is to be supplied to a filter-bed independent of the bed in the chamber $c$ into which a portion of the liquid is diverted, the invention may also be employed where the chamber $c$ is itself the sole filtering chamber and the sand-filter or percolating bed is not used, or it may be used in cases where part of the beds are of sand or percolating type with the chambers $c$ at such beds acting as pilot chambers only and part are the purifying or filtering beds in the chambers $c$.

What we claim is as follows:—

1. The combination with a sluiceway for liquid, a chamber on the outlet side of said sluiceway having a main discharge outlet, a controlling chamber, means in said controlling chamber controlled by the liquid therein to control the sluiceway, and a purifying chamber between the chamber on the outlet side of the inlet and the controlling chamber having an inlet into the first of said chambers and an outlet into the other, whereby a portion of the liquid passing the sluiceway is led through said purifying chamber into said controlling chamber.

2. The combination with a sluiceway for liquid, a chamber on the outlet side of said sluiceway having a main discharge outlet, a controlling chamber, means in said controlling chamber controlled by the liquid therein to control the sluiceway, and a purifying chamber between the chamber on the outlet side of the inlet and the controlling chamber containing a purifying bed and having an inlet into the first of said chambers opening above the surface of said bed and an outlet into the other chamber, whereby a portion of the liquid passing the sluiceway is led through the purifying bed in said purifying chamber into said controlling chamber.

3. The combination with a series of beds, each provided with an inlet for supplying liquid, a chamber adjacent to each inlet into which a portion of the liquid from said inlet is diverted, means controlled by said diverted portion of liquid for controlling the inlet to another bed in the series, and means independent of the beds for purifying said diverted portion of liquid.

4. The combination with a series of beds each provided with an inlet for supplying liquid, a chamber adjacent to each inlet into which a portion of the liquid from said inlet is diverted, means controlled by said diverted portion of liquid for closing its inlet, means also controlled by said diverted portion of liquid for opening the inlet to another bed in the series, and means independent of the bed for purifying said diverted portion of liquid.

5. The combination with a series of beds, each provided with an inlet for supplying liquid, a chamber adjacent to each inlet into which a portion of the liquid from said inlet is diverted, means controlled by said diverted portion of liquid for controlling the inlet to another bed in the series, means independent of the beds for purifying said diverted portion of liquid, and means also controlled by said diverted portion of liquid to control its discharge after it has been purified.

6. The combination with a bed, of an inlet for supplying liquid to said bed, a chamber adjacent to said inlet into which a portion of the liquid from said inlet is diverted, means independent of the bed for purifying said diverted portion of liquid, and means controlled by said diverted portion of liquid for controlling the inlet to said bed.

7. The combination with a bed, of an inlet for supplying liquid to said bed, a chamber adjacent to said inlet into which a portion of the liquid from said inlet is diverted, means independent of the bed for purifying said diverted portion of liquid, means controlled by said diverted portion of liquid for controlling the inlet to said bed, and means also controlled by said diverted portion of liquid for discharging it after it has been purified.

8. The combination with a bed, a sluiceway for supplying liquid to said bed, a chamber between said bed and sluiceway, a purifying chamber into which a portion of the liquid from said sluiceway is diverted, a controlling chamber into which the diverted portion of liquid is discharged after passing through said purifying chamber, means controlled by the liquid in said controlling chamber for controlling the sluiceway, and means also controlled by the liquid in said controlling chamber for controlling the discharge of the liquid from said chamber.

9. The combination with a bed, a sluiceway for supplying liquid to said bed, a chamber between said bed and sluiceway, a purifying chamber into which a portion of the liquid from said sluiceway is diverted, a controlling chamber into which the diverted portion of liquid is discharged after passing through said purifying chamber, a discharge chamber, a siphon leading from said controlling chamber into the discharge chamber, and means controlled by the level of the liquid in the controlling chamber for controlling said sluiceway and also for controlling the discharge of the liquid from said controlling chamber through said siphon.

10. The combination with a plurality of beds, each provided with an inlet passageway for supplying liquid to the bed, a chamber communicating with the inlet at one of the beds into which a portion of the liquid from said inlet is diverted, means controlled by said diverted portion of the liquid for controlling the inlet passageway to said bed, and means controlled by the conditions in said inlet passageway to control the inlet passageway to another bed.

11. The combination with a bed, an inlet passageway for supplying liquid to said bed, a chamber communicating with the inlet passageway into which a portion of the liquid from said inlet is diverted, means controlled by said diverted portion of the liquid for controlling the inlet passageway, means for discharging the diverted portion of liquid from said chamber, and means controlled by the conditions in the inlet passageway to control said means for discharging the diverted portion of liquid.

12. The combination with a plurality of beds each provided with an inlet passageway for supplying liquid to the bed, a chamber communicating with the inlet at one of the beds into which a portion of the liquid from said inlet is diverted, means controlled by said diverted portion of the liquid for controlling the inlet passageway to said bed, means for discharging the diverted portion of liquid from said chamber, means controlled by the conditions in the inlet passageway at said bed to control said means for discharging the diverted portion of liquid at said bed, and also controlling the inlet passageway to another bed.

13. The combination with a plurality of beds each provided with an inlet passageway for supplying liquid to the bed, a chamber communicating with the inlet at one of the beds into which a portion of the liquid from said inlet is diverted, means controlled by said diverted portion of the liquid for controlling the inlet passageway to said bed, means for discharging the diverted portion of liquid from said chamber, means controlled by the conditions in the inlet passageway at said bed to control said means for discharging the diverted portion of liquid at said bed, and also controlling the inlet passageway to another bed, and means independent of the bed for purifying the diverted portion of liquid before it is discharged.

14. The combination with a plurality of beds each provided with an inlet passageway for supplying liquid to the bed, a controlling chamber communicating with the inlet at each bed into which a portion of the liquid is diverted, means controlled by said diverted portion of the liquid to control the inlet passageway to the corresponding bed, means for discharging the diverted portion of liquid from the controlling chamber at each bed, means controlled by the conditions in the inlet passageway at any bed to control said means for discharging the diverted portion of the liquid from the controlling chamber at said bed and also controlling the inlet passageway to another bed said means being provided with a relief trap at such other bed.

15. The combination of the inlet chamber having the inlet passageway for supplying liquid to a bed, a purifying chamber communicating with the inlet chamber on the discharge side of said passageway into which a portion of the liquid is diverted, a controlling chamber communicating with said purifying chamber, an air-bell in said controlling chamber and an air-pipe leading from the air-bell to the inlet passageway.

16. The combination of the inlet chamber having the inlet passageway for supplying liquid to a bed, a purifying chamber communicating with the inlet chamber on the discharge side of said passageway into which a portion of the liquid is diverted, a controlling chamber communicating with said purifying chamber, an air-bell in said controlling chamber, an air-pipe leading from the air-bell to the inlet passageway, means to discharge the liquid from the controlling chamber, and means controlled by the conditions in the inlet passageway for controlling said means to discharge the liquid from the controlling chamber.

17. The combination with an inlet-passage for liquid, a chamber containing a filter-bed supplied with liquid from said inlet-passage, a discharge passage for the liquid after it has passed through said filter-bed, an air-bell arranged to be submerged in the liquid that passes through said bed, an air-pipe leading from the bell to the inlet-passage and having a seal adapted to be forced by the accumulated air pressure in said air pipe to admit air to said passage and air-lock it, and means controlled by surplus air forced from said passage for controlling the discharge passage.

18. The combination with an inlet-passage for liquid, a chamber containing a filter-bed supplied with liquid from said passage, a discharge passage for the liquid after it has passed through said filter-bed, an air-bell arranged to be submerged in the liquid that passes through said filter-bed, an air-pipe leading from the bell to the inlet passage and having a seal adapted to be forced by the accumulated air pressure in said air-pipe to admit air to said passage and air-lock it, means to control said discharge passage, and means controlled by the surplus air discharged from the inlet passage to release the means to control the discharge passage.

19. The combination with an inlet-passage for liquid, a chamber containing a filter-bed supplied with liquid from said passage, a discharge passage for the liquid after it has passed through said filter-bed, an air-bell arranged to be submerged in the liquid that passes through said filter-bed, an air-pipe leading from the bell to the inlet passage and having a seal adapted to be forced by the accumulated air pressure in said air-pipe to admit air to said passage and air-lock it, an air-bell to control said means to control the discharge passage, and an airpipe leading from the crown of the inlet passage to said second air-bell to discharge into the latter the surplus air supplied to the inlet passage by the first air-bell.

20. The combination with a chamber containing a filter-bed, an inlet-passage for supplying liquid to said filter-bed, a controlling chamber into which the liquid is discharged after passing said filter-bed, a discharge chamber, a siphon leading from said controlling chamber into the discharge chamber, an air-bell in the controlling chamber, an air-pipe leading from the bell to the inlet passage and having a seal adapted to be forced by the accumulated air-pressure in said air-pipe to admit air to said inlet-passage, means in said discharge chamber to control said siphon, and means controlled by the surplus air discharged from the inlet passage to release said means to control the siphon.

21. The combination with a chamber containing a filter-bed, an inlet passage for supplying liquid to said filter-bed, a second inlet-passage for supplying liquid independently of the first inlet-passage, an air-bell arranged to be submerged in the liquid that passes from the first inlet-passage to its filter-bed, an air-pipe leading from the bell to the inlet-passage to the filter-bed and having a seal adapted to be forced by the accumulated air pressure in said air pipe to admit air to said inlet-passage and air-lock it, and means controlled by the surplus air forced from said passage for controlling the second inlet-passage.

22. The combination with a chamber containing a filter-bed, an inlet passage for supplying liquid to said filter-bed, a discharge passage for the liquid after it has passed through said filter-bed, a second inlet passage for supplying liquid independently of the first inlet passage, an air-bell arranged to be submerged in the liquid that passes from the first inlet passage to its filter-bed, an air-pipe leading from the bell to the inlet passage to the filter-bed and having a seal adapted to be forced by the accumulated air pressure in said air pipe to admit air to said inlet-passage and air-lock it, and means controlled by the surplus air forced from said passage for controlling the discharge passage from said filter-bed and also the second inlet-passage.

23. The combination with independent filter-beds, of an inlet-passage for liquid to each, an air-bell arranged to be submerged in the liquid that passes into one of said filter-beds, an air pipe leading from the bell to the inlet passage which supplies that bed and having a seal adapted to be forced by the accumulated air pressure in said air pipe to admit air to said passage and air-lock it, and means controlled by the surplus air forced from said passage for releasing the inlet passage to the second bed.

24. The combination with an inlet passage for liquid, a chamber containing a filter-bed supplied with liquid from said inlet passage, an air-bell arranged to be submerged in the liquid that has passed through said bed, an air pipe leading from the bell to said inlet passage and having a seal adapted to be forced by the accumulated air pressure in said pipe to admit air to said passage and air-lock it, a second air-bell, an air pipe leading from said passage to said second air-bell to supply to the latter the surplus air supplied to the inlet passage by the first bell, a second inlet passage for supplying liquid independently of the first passage, and an air pipe leading from said second air bell to said second inlet passage for controlling said second passage.

25. The combination with an inlet passage for liquid, a chamber containing a filter-bed supplied with liquid from said inlet-passage, an air-bell arranged to be submerged in the liquid that has passed through said bed, an air pipe leading from the bell to said inlet passage and having a seal adapted to be forced by the accumulated air pressure in said pipe to admit air to said passage and air-lock it, a second air-bell, an air pipe leading from said passage to said second air-bell to supply to the latter the surplus air supplied to the inlet passage by the first bell, a second inlet passage for supplying liquid independently of the first passage, and an air pipe leading from said second air bell to said second inlet passage and provided with a relief trap for controlling said second passage.

In testimony of which invention, we have hereunto set our hands.

ALBERT PRIESTMAN.
HUBERT BEDDOES.

Witnesses:
R. M. Kelly,
E. G. Farley.